Patented July 29, 1941

2,251,215

UNITED STATES PATENT OFFICE 2,251,215

PURIFICATION OF ESTERS

John B. Tindall, Terre Haute, Ind., assignor to Commercial Solvents Corporation, Terre Haute, Ind., a corporation of Maryland No Drawing. Application February 2, 1939, Serial No. 254,184

9 Claims. (Cl. 260—499)

My invention relates to the purification of organic liquids. More particularly, it relates to a new and useful method of separating esters from ester-alcohol mixtures, and especially from crude esterification products containing an ester and its corresponding alcohol.

In the preparation of esters by the usual methods, a product results which is a mixture of ester, water, free acid and uncombined alcohol. In general, fractional distillation of such mixtures has been employed to obtain the ester therefrom. However in some instances, such as with methyl acetate and ethyl acetate, azeotropic mixtures are formed and, as a result, certain modifications of the general methods used for the purification of esters are necessary. The recovery of pure anhydrous methyl acetate is especially difficult, since the primary product obtained in distilling the crude ester is a binary constant boiling mixture of methyl acetate and methanol containing only 82% ester, by weight. If this product is treated with brine solution to remove the methanol, an aqueous solution of the ester results, from which a binary constant boiling mixture containing 96% ester and 4% water is obtained on distillation. The drying of this material with dehydrating agents constitutes an undesirable and expensive operation.

Other methods for purifying esters have consisted of treating an alcohol-containing ester with a mineral oil in the presence of water, the ester being dissolved by the mineral oil and the alcohol passing into the water layer. Upon distillation of the oil layer, the purified ester is obtained. This method has never become of great industrial importance mainly because of low efficiency and relatively high operating costs. In addition, methyl acetate could not be purified in this manner because of its insolubility in mineral oils.

I have now discovered that esters, and particularly methyl acetate, may be effectively and economically separated from aliphatic alcohols by subjecting the alcohol-containing ester to extraction with a polyhydric alcohol in which the alcohol is substantially soluble and the ester substantially insoluble. In accordance with my invention, I subject the crude ester-containing mixture to either batch or continuous extraction with a suitable polyhydric alcohol at either normal or elevated temperatures, and separately treat the resulting alcohol-polyhydric alcohol layer and the ester layer to recover the alcohol and extracting medium from the former, and to recover purified ester from the latter.

Any mixture of an ester and an aliphatic alcohol may be treated in accordance with my process to obtain purified ester, but this process is particularly adapted to the purification of esters admixed with aliphatic alcohols containing from 1 to 4 carbon atoms. My process is especially useful in recovering esters of aliphatic alcohols containing from 1 to 4 carbon atoms from mixtures of such esters and their corresponding alcohols. Mixtures such as the primary distillation products from the production of such esters by direct esterification are especially suited to treatment by my process.

The extractants which may be satisfactorily employed in my process constitute the polyhydric aliphatic alcohols, and preferably the dihydric and trihydric alcohols. As examples of suitable extractants there may be mentioned: ethylene glycol, 1,2-propylene glycol, 1,3-propylene glycol, 1,2-butylene glycol, 2,3-butylene glycol, and glycerol. The extractants are preferably employed in the anhydrous state, especially if the ester-alcohol mixture is substantially water-free, and if the ester is capable of forming constant-boiling mixtures with water.

In common with other extraction processes, my present process requires the extraction to be carried through a number of stages, or to be effected continuously with an adequate ratio of extractant to crude ester, in order to obtain, by this method alone, an ester of a high degree of purity. However, an outstanding advantage of my process constitutes the fact that it may be combined with distillation methods to form a highly efficient purification system. Thus, only partial removal of the methanol from the methanol-methyl acetate constant-boiling mixture, by extraction in accordance with my process, will enable the remainder of the methanol to be distilled from the extracted product in the form of the methanol-methyl acetate constant-boiling mixture, leaving a distillation residue of pure, anhydrous, alcohol-free methyl acetate.

My process may be more particularly illustrated by the following examples:

Example I

A mixture of 105 parts by weight of anhydrous glycerol and 315 parts by weight of a solution consisting of 82% by weight methyl acetate and 18% by weight methanol was thoroughly agitated and then allowed to stand and separate into layers. The upper layer was decanted and again extracted with approximately one-third of its weight of anhydrous glycerol, and this procedure was then repeated for a third time. At the end of each stage of the extraction samples of the upper layer were distilled to separate the methyl acetate and methanol from the glycerol, and the methyl acetate-methanol mixture was analyzed for methyl acetate, with the results shown in the table below:

| Stage of extraction | Quantity of upper layer | Methyl acetate in methyl acetate-methanol portion |
| --- | --- | --- |
| | Parts by weight | Percent |
| First stage | 311.9 | 86.0 |
| Second stage | 254.8 | 90.6 |
| Third stage | 204.0 | 93.5 |

On fractionally distilling a charge of the final upper layer obtained after the third stage of the extraction process, the methanol is first removed in the form of the methanol-methyl acetate constant-boiling mixture. Approximately 33% by weight of the charge is thus removed, followed by a fraction of anhydrous, methanol-free methyl acetate, constituting approximately 59% by weight of the charge, leaving a residue of glycerol constituting approximately 8% by weight of the charge.

*Example II*

252 parts by weight of anhydrous glycerol was introduced into the top of a scrubbing tower packed with Raschig rings, the rate of flow being controlled by a constant head box. Through an inlet located near the bottom of the tower and midway between the center and the side wall, was simultaneously introduced, by means of gravity flow, 232 parts by weight of a methyl acetate-methanol mixture containing 82% by weight of methyl acetate. The glycerol and crude methyl acetate were introduced at the same rate, two distinct layers being maintained in the tower at all times. During this process, globules of methyl acetate rose through the extract layer until the interface was reached, at which point they became a part of the upper layer. As the ester layer increased, it was removed from the top of the tower, and conducted to a suitable distilling apparatus, where it was further purified. The glycerol extract was simultaneously removed from the bottom of the tower. During the operation, samples were taken from various levels in the tower, distilled to a liquid temperature of 100° C. to separate the methyl acetate and methanol from the glycerol, and the methyl acetate-methanol mixtures were then analyzed for methyl acetate, with the results shown in the table below:

| Sample No. | Source of sample | Methyl acetate in methyl acetate-methanol portion |
| --- | --- | --- |
| | | Percent |
| 1 | Draw-off at top of tower | 97.03 |
| 2 | Upper layer in tower | 94.01 |
| 3 | Lower layer in tower | 72.8 |
| 4 | Draw-off at bottom of tower | 70.44 |

On fractionally distilling a charge of the draw-off from the top of the tower, the methanol is first removed in the form of the methyl acetate-methanol constant-boiling mixture. Approximately 15.5% by weight of the charge is thus removed, followed by a fraction of anhydrous, methanol-free methyl acetate constituting approximately 80.9% by weight of the charge, leaving a residue of glycerol constituting approximately 3.6% by weight of the charge.

Other esters such as, for example, ethyl acetate, propyl acetate, butyl acetate, methyl propionate, and the like may also be similarly separated from their corresponding alcohols or from other alcohols by extraction with glycerol. Also other polyhydric alcohols may be used as the extractant in place of glycerol as, for example, one of the propylene or butylene glycols. Although ethylene glycol is not a suitable extractant for use in the purification of methyl acetate, since both methyl acetate and methyl alcohols are soluble therein, it has been found to be suitable for the separation of esters which contain more than three carbon atoms from alcoholic mixtures thereof. It is to be understood that I may generally employ polyhydric alcohols as extractants in my process so long as the particular polyhydric alcohol selected is a solvent for the alcohol which it is desired to separate from the ester being purified, and a non-solvent or substantially so, for the ester being refined.

It is apparent that many uses and variations of my process may be applied without departing from the spirit of my invention. For example, I may subject the ester to countercurrent batch extraction instead of employing the common batch or continuous extraction methods. Similarly, although I prefer to carry out the process continuously by introducing the crude ester into an extraction tower in a liquid form, it is to be understood that the introduction of said crude ester in any other convenient form, such as for example the vapor phase, lies within the scope of my invention.

My invention having now been described, what I claim is:

1. In a process for the separation of carboxylic esters from a substantially anhydrous ester-alcohol mixture, the step which comprises extracting said ester-alcohol mixture with a polyhydric alcohol containing from 2 to 5 carbon atoms in which the said ester is substantially insoluble, to obtain said ester in a substantially alcohol-free state.

2. In a process for the separation of carboxylic esters from a substantially anhydrous mixture comprising essentially said esters and their corresponding alcohols, the step which comprises extracting said ester-alcohol mixture with a polyhydric alcohol containing from 2 to 5 carbon atoms in which the said ester is substantially insoluble, to obtain said esters in a substantially alcohol-free state.

3. In a process for the separation of aliphatic alcohols from substantially anhydrous carboxylic ester-alcohol mixtures, the steps which comprise extracting said ester-alcohol mixtures with a polyhydric alcohol containing from 2 to 5 carbon atoms in which the said ester is substantially insoluble, subsequently separating the two layers formed thereby and recovering said ester in a substantially alcohol-free state.

4. In a process for the separation of carboxylic esters from a substantially anhydrous mixture comprising essentially alcohols and esters, said alcohols containing from 1 to 4 carbon atoms, the steps which comprise extracting said ester-alcohol mixture with glycerol, subsequently separating the two layers formed thereby and recovering the ester in a substantially alcohol-free state by distillation.

5. In a process for the purification of a substantially anhydrous mixture of methyl acetate and an aliphatic alcohol containing from 1 to 4 carbon atoms the steps which comprise extracting said methyl acetate-alcohol mixture with anhydrous glycerol, subsequently separating the two layers formed thereby and recovering said methyl acetate in a substantially alcohol-free state by distillation.

6. In a process for the separation of carboxylic esters having in excess of 3 carbon atoms from a substantially anhydrous alcohol-ester mixture, the steps which comprise extracting said ester-alcohol mixture with ethylene glycol, subsequently separating the two layers formed thereby and recovering the ester in a substantially alcohol-free state by distillation.

7. In a process for the recovery of a carboxylic ester from a substantially anhydrous mixture of said ester and an aliphatic alcohol, the steps which comprise countercurrently extracting said ester-alcohol mixture with an anhydrous polyhydric alcohol containing from 2 to 5 carbon atoms in which the said ester is substantially insoluble, and recovering said ester from the raffinate in a substantially alcohol-free state.

8. In a process for the recovery of methyl acetate from a substantially anhydrous mixture of methyl acetate and methyl alcohol, the steps which comprise countercurrently extracting said methyl alcohol-methyl acetate mixture by means of an anhydrous polyhydric alcohol in which the said methyl alcohol is substantially soluble and the said ester substantially insoluble, and subsequently fractionally distilling the raffinate thus secured to recover the methyl acetate in a substantially alcohol-free state.

9. In a process for the recovery of methyl acetate from a substantially anhydrous mixture of methyl acetate and methyl alcohol, the steps which comprise countercurrently extracting said methyl alcohol-methyl acetate mixture by means of anhydrous glycerol, and subsequently fractionally distilling the raffinate thus secured to recover the methyl acetate in a substantially alcohol-free state.

JOHN B. TINDALL.